United States Patent
Dudar (10) Patent No.: US 12,460,608 B2
(45) Date of Patent: Nov. 4, 2025

(54) METHODS AND SYSTEMS FOR AN EVAPORATIVE EMISSION SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 168 days.

(21) Appl. No.: 18/454,279

(22) Filed: Aug. 23, 2023

(65) Prior Publication Data

US 2025/0067232 A1 Feb. 27, 2025

(51) Int. Cl.
| | |
|---|---|
| *F02M 25/08* | (2006.01) |
| *B60H 1/22* | (2006.01) |
| *F02D 41/00* | (2006.01) |
| *F02D 41/02* | (2006.01) |

(52) U.S. Cl.
CPC ....... *F02M 25/0854* (2013.01); *B60H 1/2206* (2013.01); *F02D 41/0032* (2013.01); *F02D 41/021* (2013.01); *F02M 25/0836* (2013.01); *F02M 2025/0881* (2013.01)

(58) Field of Classification Search
CPC ........... F02M 25/0854; F02M 25/0836; F02M 2025/0881; F02M 25/089; B60H 1/2206; F02D 41/0032; F02D 41/021; F02D 41/0035; F02D 41/042
See application file for complete search history.

(56) References Cited

U.S. PATENT DOCUMENTS

| | | | | |
|---|---|---|---|---|
| 5,054,453 | A * | 10/1991 | Onufer | B67D 7/0476 261/96 |
| 6,318,077 | B1 * | 11/2001 | Claypole | F01N 3/2006 60/303 |
| 6,394,074 | B1 * | 5/2002 | Okada | F02M 25/089 123/519 |
| 7,448,366 | B2 | 11/2008 | Potier et al. | |
| 9,174,627 | B2 | 11/2015 | Atsumi | |
| 10,378,485 | B2 | 8/2019 | Dudar | |
| 11,525,422 | B1 | 12/2022 | Dudar | |
| 12,234,757 | B1 * | 2/2025 | Dudar | F01N 9/002 |
| 2006/0065253 | A1 * | 3/2006 | Reddy | F01N 5/02 123/520 |
| 2006/0273184 | A1 * | 12/2006 | Pohner | B60H 1/2206 237/28 |

(Continued)

FOREIGN PATENT DOCUMENTS

DE 102008036255 B4 4/2022

OTHER PUBLICATIONS

Foote, B., "Ford Plug-In Hybrids Still Allowed Under New 2035 Carb Ruling," Ford Authority Website, Available Online at https://fordauthority.com/2022/08/ford-plug-in-hybrids-still-allowed-under-new-2035-carb-ruling/, Aug. 26, 2022, 1 page.

*Primary Examiner* — Kurt Philip Liethen
(74) *Attorney, Agent, or Firm* — Vincent Mastrogiacomo; McCoy Russell LLP (57) ABSTRACT

Methods and systems are provided for a fuel system. In one example, a method may include adjusting operation of a fuel-operated heater (FOH) in response to a condition of a canister. The FOH is activated and configured to flow heated air to the canister to promote desorption of fuel vapors stored therein.

15 Claims, 6 Drawing Sheets

(56) References Cited

U.S. PATENT DOCUMENTS

| | | | |
|---|---|---|---|
| 2006/0278201 A1* | 12/2006 | Nakamura | F02M 25/0836 123/519 |
| 2008/0264391 A1* | 10/2008 | Yamamoto | F02D 29/06 123/519 |
| 2011/0100337 A1* | 5/2011 | Orth | F02M 25/0836 123/519 |
| 2011/0203261 A1* | 8/2011 | Kotrba | F01N 3/2066 60/299 |
| 2012/0312281 A1* | 12/2012 | Tsutsumi | F02M 25/089 123/519 |
| 2013/0032127 A1* | 2/2013 | Jentz | F02M 25/0809 123/520 |
| 2014/0311458 A1* | 10/2014 | Tsumagari | F01N 3/18 123/478 |
| 2017/0267064 A1* | 9/2017 | Brandt | B60H 1/2206 |
| 2019/0055905 A1 | 2/2019 | Dudar | |
| 2020/0130469 A1* | 4/2020 | Litz | B60H 1/2226 |

* cited by examiner

METHODS AND SYSTEMS FOR AN EVAPORATIVE EMISSION SYSTEM

FIELD

The present description relates generally to methods and systems for an evaporative emissions control system of a vehicle.

BACKGROUND/SUMMARY

Vehicle fuel systems include evaporative emission control systems (EVAP) designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, such as when the engine is in operation, the evaporative emission control system allows the vapors to be purged into the engine intake manifold for use as fuel. Fuel vapors may be generated as refueling, running loss, hot soak, and diurnal temperature vapors. In a hybrid vehicle, the fuel vapors stored in the canister are primarily refueling vapors.

Vehicle manufacturers may increase an electrical capability of one or more vehicles of a vehicle fleet. The expansion of electric vehicle capabilities may result in reduced engine operating times, and therefore reduced opportunities for fuel vapors to be consumed during canister venting. Additionally, non-hybrid vehicles, such as internal combustion engine (ICE) only vehicles, may be equipped with start/stop and other features to decrease an engine run time. Each of these advancements present challenges to a frequency in which canister cleaning may occur. Thus, methods and system that differentiate from those that already exist may be desired to meet the various objectives.

In one example, the issues described above may be addressed by a method for heating air using a fuel-operated heater (FOH) and routing heated air from the FOH to a canister in an evaporative emissions control system. By doing this, the FOH may promote desorption of vapors from the canister.

As an example, the FOH may be configured to consume vapors desorbed from the canister in a closed loop system. In such an example, heated air from the FOH flows to the canister to promote vapor release. The vapors from the canister may flow to the FOH for combustion. Additionally or alternatively, the vapors from the canister may flow to an engine during certain conditions, such as an engine start/stop or other event where an engine restart will occur following purging the canister. The vapors may be stored in the engine via adjusting a position of engine valve and consumed during a subsequent restart. Operation of the FOH may consume less fuel than the engine while providing controlled treatment of vapors within the canister. By doing this, emissions of a vehicle comprising the FOH and the canister may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
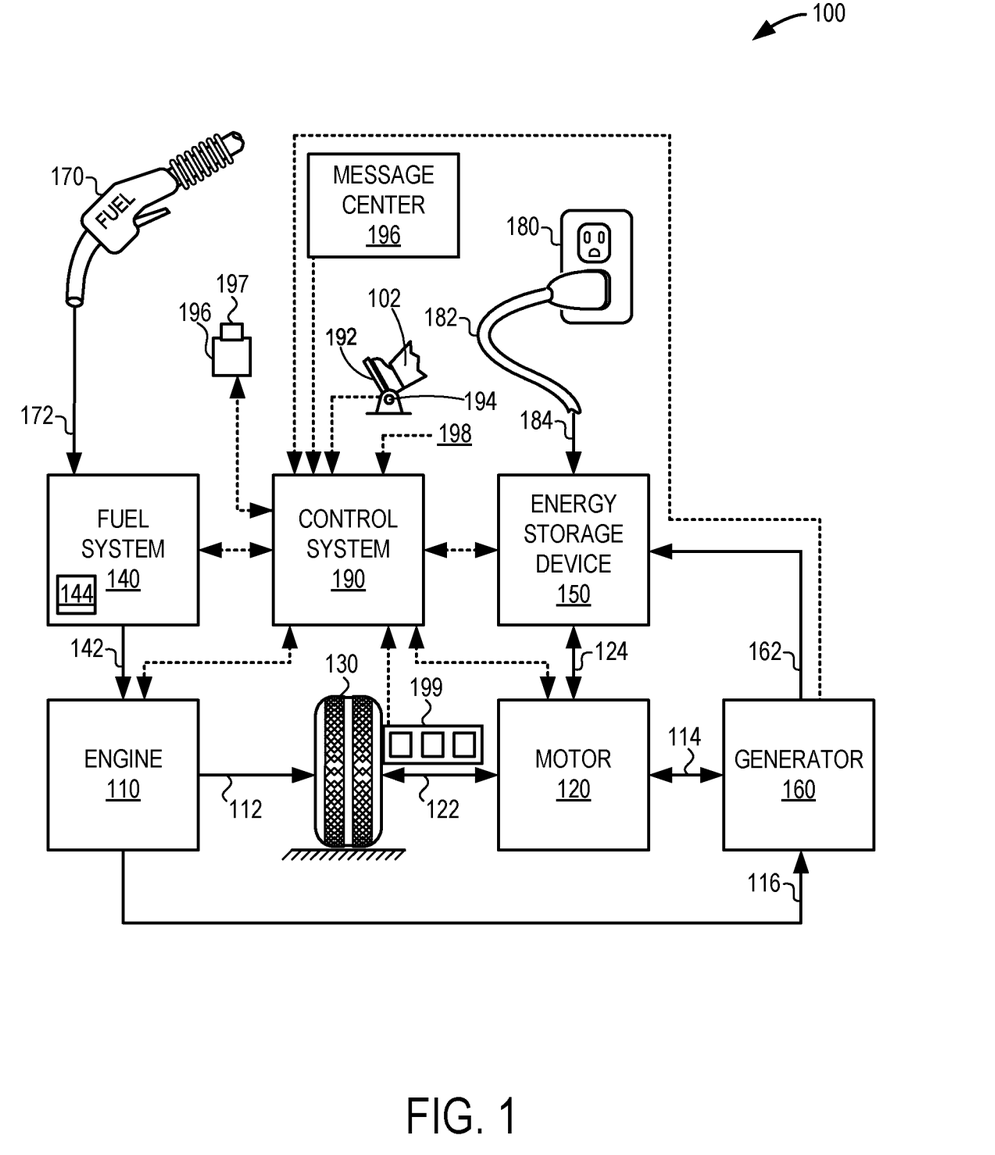
FIG. 1 shows a high-level block diagram illustrating an example vehicle propulsion system.
Figure 2:
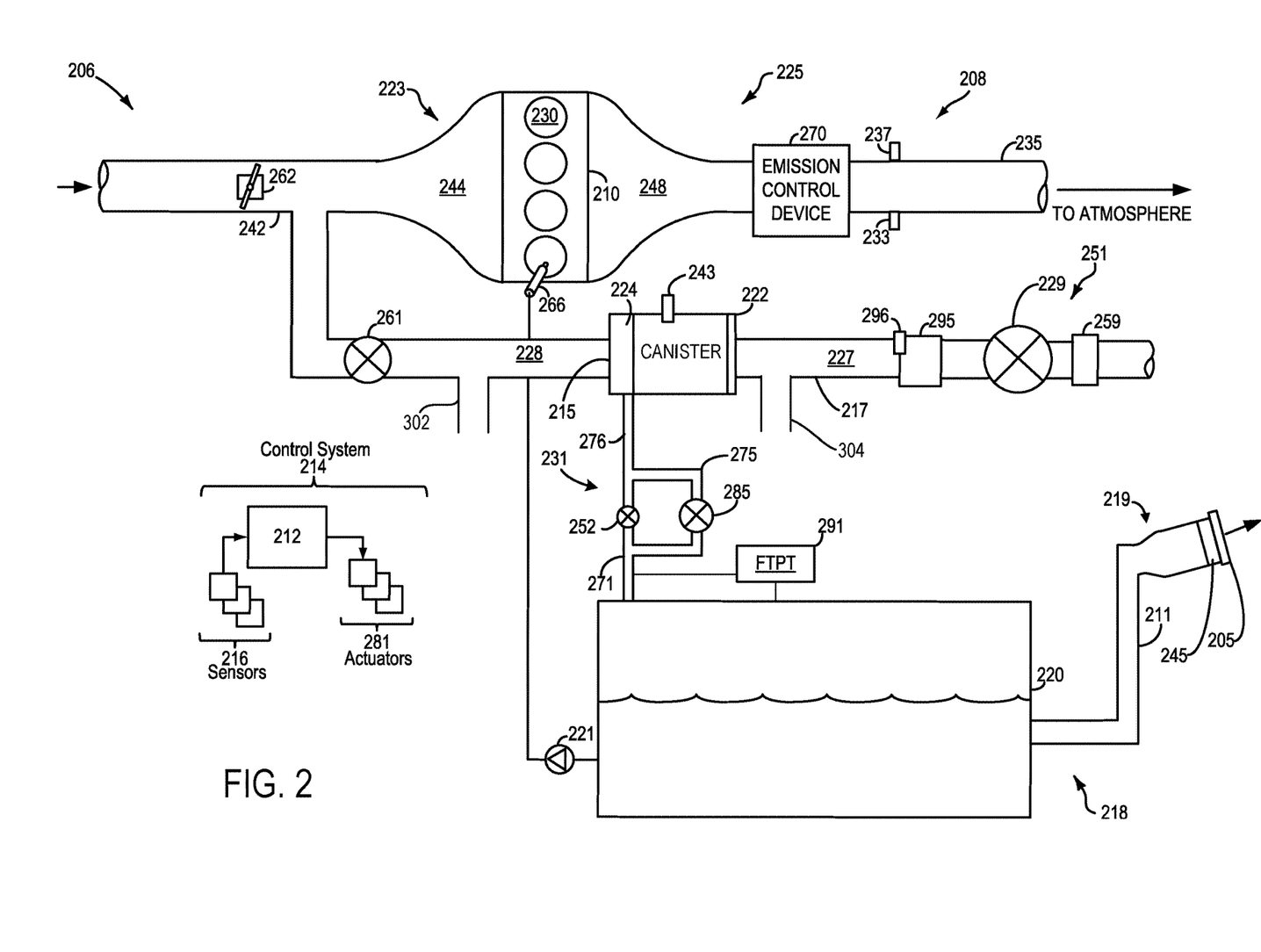
FIG. 2 shows an example engine system, fuel system, and evaporative emissions control (EVAP) system included in the example vehicle system of FIG. 1.
Figure 3:
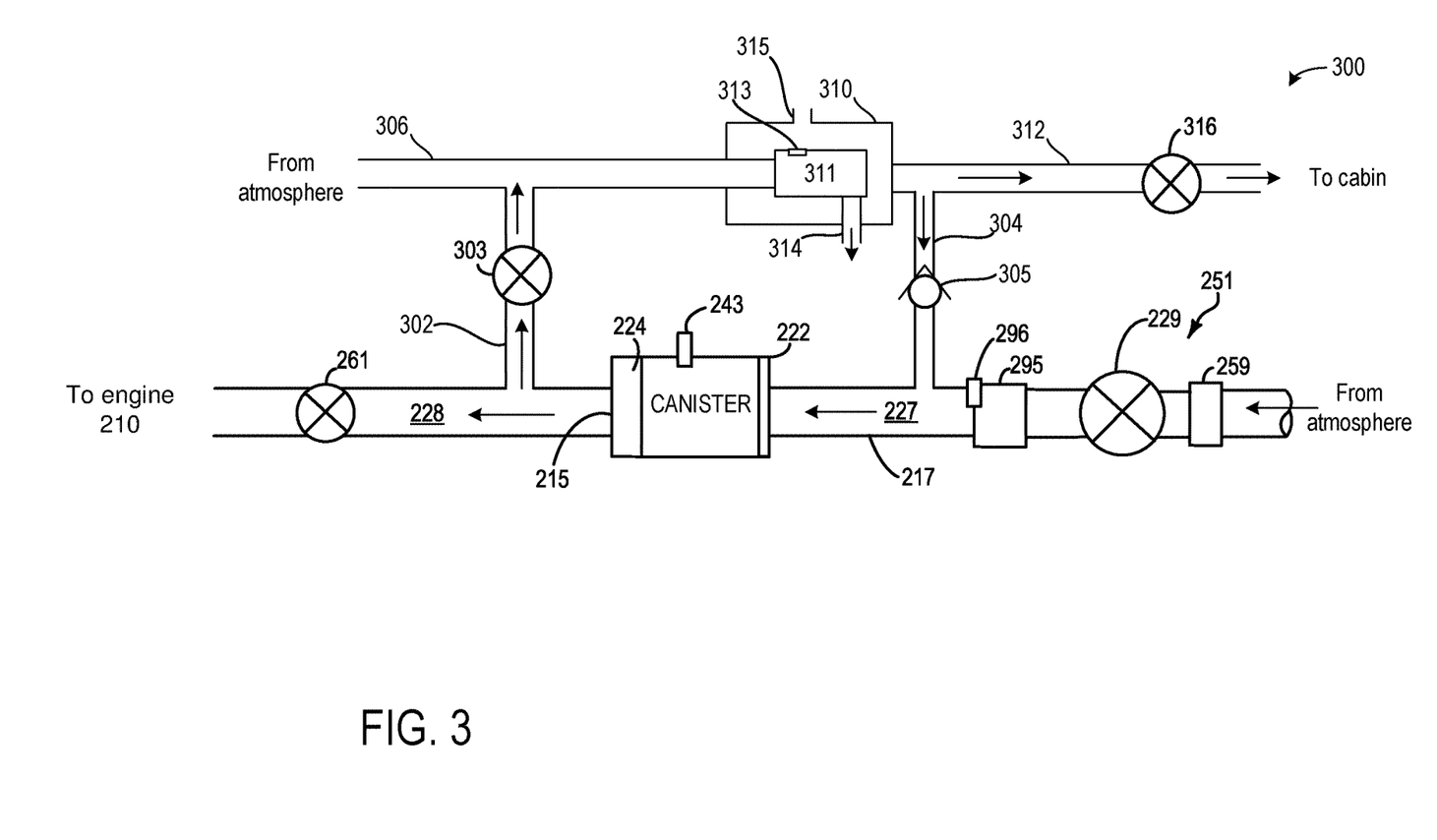
FIG. 3 shows an example of a fuel operated heater (FOH) system coupled to the EVAP system.
Figure 4:
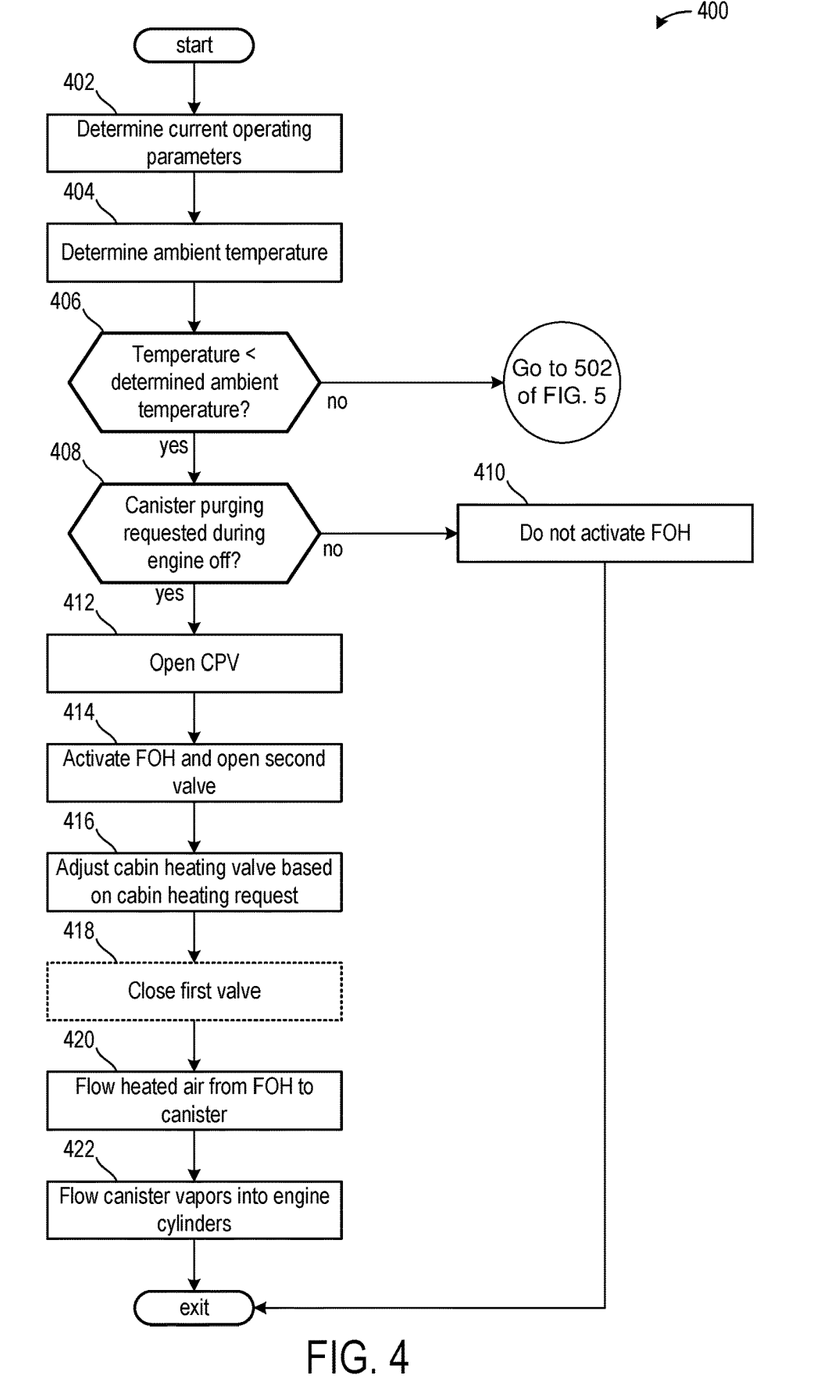
FIG. 4 shows a first method for operating a FOH of the FOH system.
Figure 5:
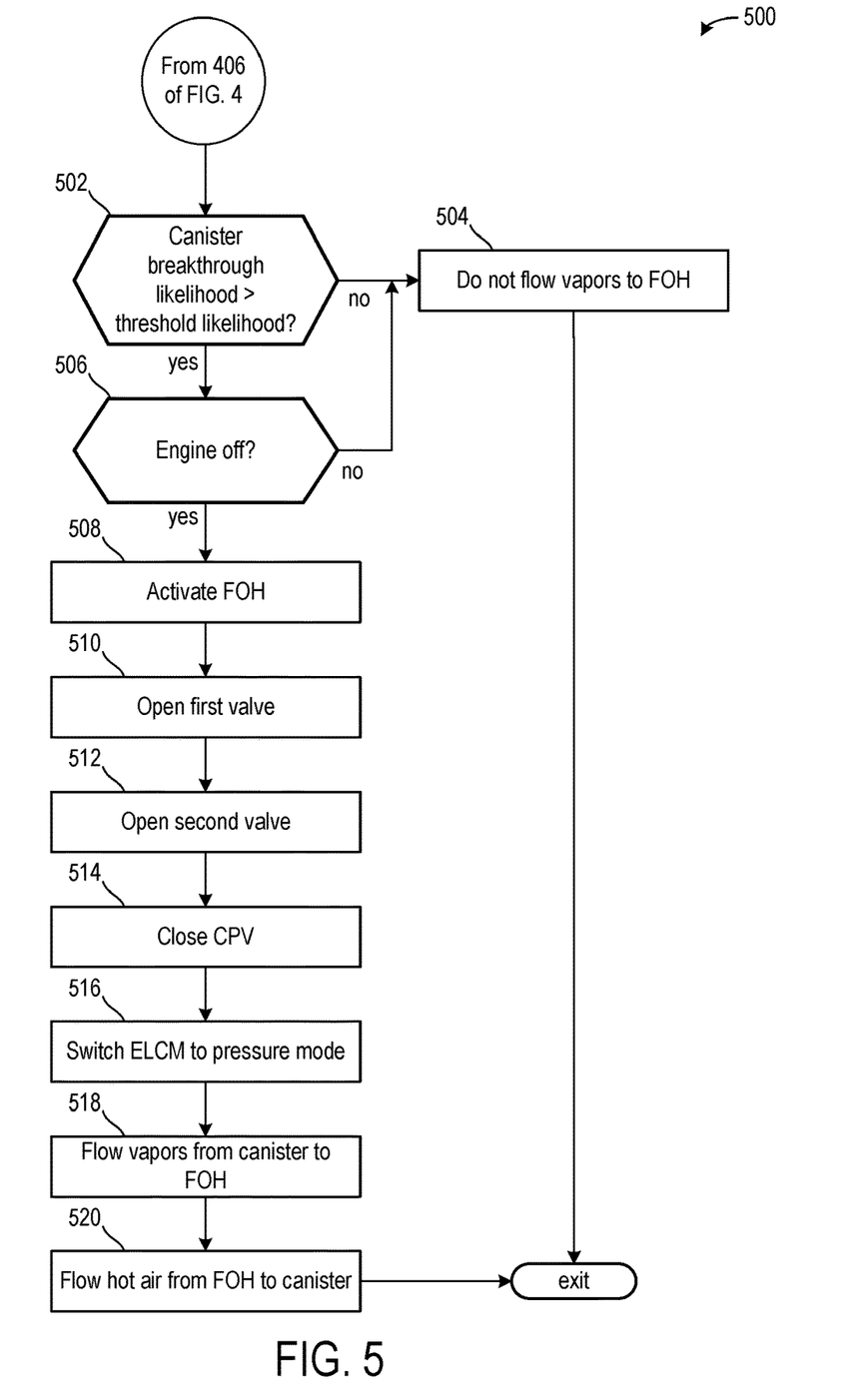
FIG. 5 shows a second method for operating the FOH of the FOH system.
Figure 6:
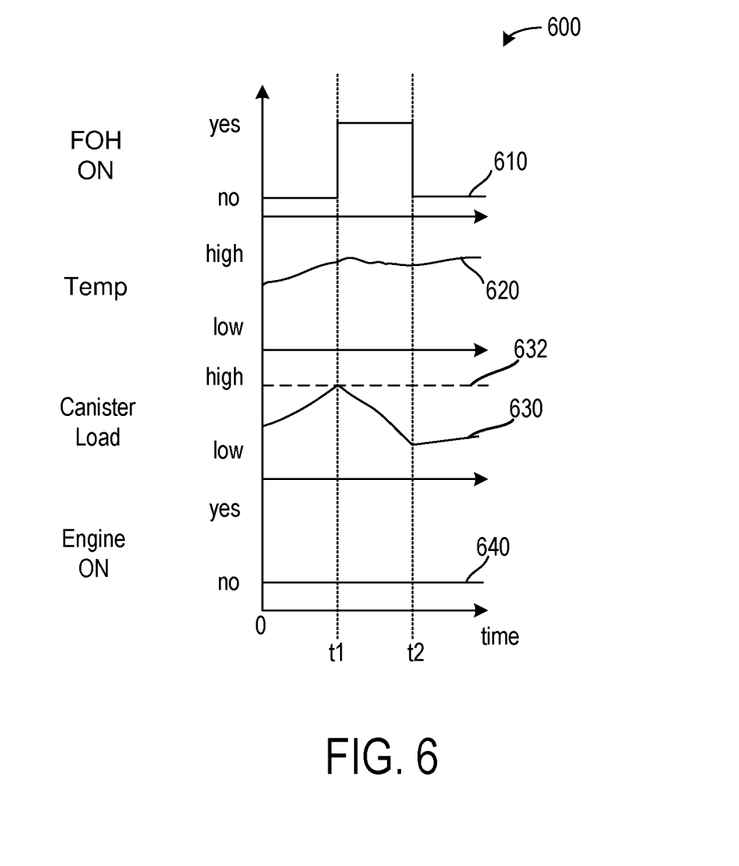
FIG. 6 shows an operating sequence illustrating FOH system and EVAP system conditions.

The following description relates to systems and methods for an EVAP system of a vehicle. The vehicle may be an at least partially electric vehicle including an all-electric mode. An example of the vehicle and EVAP system is shown in FIGS. 1 and 2. The EVAP system may be coupled to a fuel operated heater (FOH) system, as shown in FIG. 3. Operation of the EVAP system and FOH may be controlled via a controller. FIG. 4 shows a first method for operating a FOH of the FOH system. FIG. 5 shows a second method for operating the FOH of the FOH system. FIG. 6 shows an operating sequence illustrating FOH system and EVAP system conditions.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or a driver pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an evaporative emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as the vehicle propulsion system 100 of FIG. 1.

The engine system 208 may include engine 210 having a plurality of cylinders 230. In one example, engine 210 is an embodiment of engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as an example injector 266 shown. The fuel pump system 221 may be further configured to deliver fuel to a fuel operated heater (FOH) system. While a single injector 266 is shown, additional injectors are provided for each cylinder. It will be appreciated that fuel system 218 may be a return-less fuel system, a return fuel system, or various other types of fuel system.

Vapors generated in fuel system 218 may be routed to the evaporative emissions control system 251, which includes fuel vapor canister 222 via vapor line 231, before being purged to the engine intake 223. Vapor line 231 may be coupled to fuel tank 220 via one or more conduits and may include one or more valves for isolating the fuel tank during certain conditions. For example, vapor line 231 may be coupled to fuel tank 220 via one or more or a combination of conduits 271, 275, and 276.

Further, in some examples, one or more fuel tank vent valves may be positioned in conduits 271, 275, or 276. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a fuel tank isolation valve (FTIV) 252. Conduit 275 may include a relief valve (RV) 285. In one example, the conduit 275 is a bypass conduit, wherein the RV 285 is configured to flow vapors to the canister 222 when the FTIV 252 is closed. Further, in some examples, vapor line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe 211.

Further, refueling system 219 may include a refueling lock 245. In some embodiments, the refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on vehicle instrument panel 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218. When the emissions control system 251 includes more than one canister 222, the canisters may be arranged in series or in parallel. When the canisters are arranged in series, gases may be routed to a first canister of the more than one canisters, then from the first canister to a second canister of the more than one canisters, and so on for additional canisters of the one or more canisters. When the canisters are arranged in parallel, a total volume of gases routed through the more than one canisters may be routed to the first canister or the second canister, or the total volume of gases may be divided into two volumes with a first volume of the two volumes routed through the first canister and a second volume of the two volumes routed through the second canister.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be adjusted by canister vent valve 229.

Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

Canister 222 may include a first buffer 224 surrounding load port 213. Like canister 222, buffer 224 may also include adsorbent. The volume of buffer 224 may be smaller than (e.g., a fraction of) the volume of canister 222. The adsorbent in the buffer 224 may be same as, or different from, the adsorbent in the canister (e.g., both may include charcoal). Buffer 224 may be positioned within canister 222 such that during canister loading through load port 213, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In comparison, when purging canister 222 with air drawn through vent line 227, fuel vapors are first desorbed from the canister (e.g., to a threshold amount) before being desorbed from the buffer. In other words, loading and unloading of buffer 224 is not linear with the loading and unloading of the canister. As such, the effect of the canister buffer is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via an outlet conduit 276, the outlet conduit 276 diverging from the fuel tank isolation valve (FTIV) 252 which controls the flow of fuel tank vapors from fuel tank 220 and through the inlet conduit 271 into canister 222. By adjusting a position of FTIV 252, fuel vapor flow from the fuel tank 220 to the canister 222 can be varied. FTIV 252 may be actuated to a first, open position that couples fuel tank 220 to canister 222 via conduit 276. In an example where the emissions control system 251 includes more than one canister 222 arranged in parallel, adjusting the position of the FTIV 252 to a first position may direct fuel vapor flow from the fuel tank 220 to a first canister, adjusting to a second position may direct fuel vapor flow from the fuel tank 220 to a second canister, and adjusting to a third position may direct fuel vapor flow from the fuel tank 220 to both the first and the second canisters. The FTIV may also be actuated to a fourth, closed position.

For example, FTIV 252 may be actuated to a closed position that seals fuel tank 220 from canister 222 when the emissions control system 251 includes one canister 222, wherein no fuel vapors flow through conduit 276. Controller 212 may command an FTIV position based on fuel system conditions including an operator request for refueling, fuel tank pressure, and canister load. In a second example, a 0.03" orifice is included in the place of FTIV 252 to restrict vapor flow to the canister.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations.

Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, when the emissions control system 251 includes one canister 222, FTIV 252 may be actuated to the first open position to depressurize the fuel tank to the canister via first conduit 276 and canister load port 213.

In some embodiments (not shown), a pressure control valve (PCV) (e.g., RV 285) may be configured in a conduit coupling fuel tank 220 to canister 222 in parallel to conduit 276. When included, the RV may be controlled by the powertrain control module (e.g. controller 212) using a pulse-width modulation cycle to relieve any excessive pressure generated in the fuel tank, such as while the engine is running. Additionally or optionally, the RV may be pulse-width modulated to vent excessive pressure from the fuel tank when the vehicle is operating in electric vehicle mode, for example in the case of a hybrid electric vehicle.

When transitioned to a second (open) position for the emissions control system 251 with one canister 222, FTIV 252 allows for the venting of fuel vapors from fuel tank 220 to canister 222. The second open position may be a fully open position and the first open position may be a partially open position, e.g., half open.

For the emissions control system 251 with at least one canister 222, including more than one canister 222 arranged in parallel, fuel vapors may be stored in canister 222 while air stripped off fuel vapors exits into atmosphere via canister vent valve 229. Stored fuel vapors in the canister 222 may be purged to engine intake 223, when engine conditions permit, via the purge valve 261. Refueling lock 245 may be unlocked to open a fuel cap after fuel tank is sufficiently depressurized, such as below the second threshold pressure.

The RV 285 may open during conditions where the fuel tank pressure exceeds a threshold fuel tank pressure without input from controller 212. This may occur during conditions where the controller 212 is asleep, which may occur when the engine is off and/or when the vehicle is off. Venting events when the controller 212 is asleep may go untracked in prior art examples, leading to insufficient canister cleanings, which may result in vapors being released to atmosphere. This may be exacerbated in hybrid vehicles where the engine may be off for prolonged periods of vehicle operation. In one example, the evaporative emissions control system 251 may be fluidly coupled to the FOH system via a first passage 302 and a second passage 304. The FOH system is illustrated in further detail with respect to FIG. 3. The FOH system may be operated to flow heated air to the canister 222, which may release vapors therefrom during desired conditions.

The vehicle system 206 may further include a control system 214 (such as control system 190 of FIG. 1). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include the fuel injector 266, the throttle 262, the FTIV 252, the refueling lock 245, the canister vent valve 229, and the purge valve 261. The control system 214 may include a controller 212. The controller may receive input data from the various sensors, process the input data, and trigger the actuators in response to the processed input data based on instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

For example, responsive to an operator refueling request, the controller may retrieve sensor input from fuel tank pressure transducer (FTPT) 291 and compare it to a threshold. If the pressure is higher than the threshold, the controller may send a signal commanding FTIV 252 to a position that expedites depressurization of the fuel tank. Therein, based on canister load, as estimated via sensor 243, and/or based on an estimated time to depressurize the fuel tank, the controller 212 may adjust the position of FTIV 252 to depressurize the fuel vapors to the load port 213 of canister 222. Once the fuel tank has been sufficiently depressurized, as inferred based on the fuel tank pressure sensor output, the controller may send a signal commanding the refueling lock 245 to open or disengage so that fuel can be received in fuel tank 220 via the fuel filler pipe 211.

Turning now to FIG. 3, it shows a FOH system 300. The FOH system 300 may be fluidly coupled to the evaporative emissions control system 251 via the first passage 302 and the second passage 304. In one example, the first passage 302 is an inlet passage and the second passage 304 is an outlet passage. The first passage 302 may intersect with the purge line 228 at a junction between the canister 222 and the purge valve 261 at a first extreme end. The first passage 302 may intersect with a FOH inlet passage 306 at a location upstream of a FOH 310 relative to a direction of gas flow. A first valve 303 may be arranged in the first passage 302 and configured to control vapor flow from the canister 222 to the FOH inlet passage 306. The first valve 303 may be adjusted to a fully closed position, a fully open position, or any position therebetween based on a desorption of vapors from the canister 222. Additionally or alternatively, the position of the first valve 303 may be adjusted based on an operation of the engine.

The FOH 310 may be configured to combust fuel. When combusting fuel, the FOH 310 may heat air. The heated air may be expelled through an FOH outlet 312. Combustion gases may be expelled from the FOH 310 via an exhaust outlet 314, separate from the FOH outlet. The exhaust outlet 314 may direct combustion gases directly to atmosphere. In one example, additionally or alternatively, the exhaust outlet 314 may direct combustion gases to the engine exhaust 225 of FIG. 2. The combustion gases of the FOH 310 do not mix with ambient air or heated air flowing therethrough. In one example, the FOH 310 may include at least one combustion chamber 311 with an ignition device 313. Fuel and air may be supplied to the combustion chamber 311, wherein air may flow outside and around the at least one combustion chamber 311. The combustion chamber 311 may be hermetically sealed from passages flowing ambient and heated air through the FOH 310. The FOH 310 may receive fuel via a fuel pump (e.g., fuel pump 221 of FIG. 2 or a separate fuel pump). Additionally or alternatively, fuel vapors from the canister 222 may be a fuel source for the FOH 310. Thus, in one example, the FOH 310 may include a clean air inlet 315 in which the air provided from the clean air inlet is heated and does not mix with fuel vapor or liquid fuel. In one example, the clean air inlet may be a single, continuous passage with the FOH outlet 312, wherein sections of the passage may wrap or extend proximally to the cylinder 311. The air may be heated as a result of combustion, wherein the heated air is directed to the FOH outlet 312.

A cabin heating valve 316 may be arranged in the FOH outlet 312 at a location downstream of a junction between the FOH outlet 312 and the second passage 304. The cabin heating valve 316 may be adjusted to a fully closed position, a fully open position, or any position therebetween based on a cabin heating request. The position of the cabin heating valve 316 may be further adjusted based on an engine operation in combination with the cabin heating request. In one example, the cabin heating valve may control heated air flow to a vehicle cabin interior.

A second valve 305 may be arranged in the second passage 304. The second valve 305 is configured to control heated air flow from the FOH outlet 312 to a junction between the second passage 304 and the vent line 227. In one example, the second passage 304 intersects with the vent line 227 at a location between the canister 222 and the ELCM 295 at a first extreme end. A second extreme end of the second passage 304, opposite the first extreme end, intersects with the FOH outlet 312 at a junction between the FOH 310 and the cabin heating valve 316. In one example, the second valve 305 is a check valve configured to open in the presence of heated air entering the second passage 304 from the FOH outlet 312. In such an example, the second valve 305 may be thermostatically controlled via a wax or similar element. Additionally or alternatively, the second valve 305 may be controlled by a controller and configured to move to a fully closed position, a fully open position, or any position therebetween.

Arrows included in FIG. 3 indicate a direction in which gases may flow during various conditions of the FOH system 300 and the evaporative emission control system 251. Positions of the purge valve 261, the first valve 303, the second valve 305, and the cabin heating valve 316 may be adjusted based on a condition of at least the canister 222. Methods of FIGS. 4 and 5 illustrate operations for releasing vapors from the canister 222 via heated air from the FOH 310 during engine off conditions to control vapor emissions from and a load of the canister 222. By doing this, vehicle emissions may be reduced. The vapors released by the canister 222 may be stored in cylinders of the engine prior to an engine start and/or consumed by the FOH 310 as it heats air.

Turning now to FIG. 4, it shows a method 400 for flowing heated air to the canister via the FOH. The canister vapors flow to and are stored in engine cylinders prior to an engine restart. Instructions for carrying out method 400 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

The method 400 begins at 402, which includes determining current operating parameters. Current operating parameters may include, but are not limited to, one or more of a manifold vacuum, an engine speed, an engine temperature, a vehicle speed, and an air/fuel ratio.

At 404, the method 400 may include determining an ambient temperature. The ambient temperature may be determined via a temperature sensor mounted to the vehicle. The temperature sensor may be distal to other heat emitting devices such that heat released by other vehicle components may not affect a temperature reading of the temperature sensor. Additionally or alternatively, the ambient temperature may be provided by a weather service through a wireless connection. In some examples, a mobile device may provide the ambient temperature through a wireless connection. The ambient temperature may be further based on sunlight, wind, ground surface, rain, and the like. For example, direct sunlight may increase the ambient temperature reading. Additionally or alternatively, if the ground surface is pavement, then the ambient temperature reading may be increased compared to if the ground surface is dirt when a relative high amount of sunlight is directed toward the vehicle.

At 406, the method 400 may include determining if the ambient temperature is less than a determined ambient temperature. The determined ambient temperature may be based on a temperature at which fuel vapors may be released from the canister. During certain conditions, such as when the engine is off, it may be desirable to treat the canister vapors due to ambient temperatures greater than or equal to the determined ambient temperature. If the ambient temperature is not less than the determined ambient temperature, then the method 400 may proceed to 502 of FIG. 5.

If the ambient temperature is less than the determined ambient temperature, then at 408, the method 400 may include determining if canister purging is requested during an engine off event. In one example, the engine may be off due to a start/stop event. If canister purging is not requested or if canister purging is requested and the engine is on, then at 410, the method 400 may include not activating the FOH.

If canister purging is requested and the engine is off, then at 412, the method 400 may include opening the canister purge valve (CPV), such as purge valve 261 of FIG. 2. As such, vapors from the canister may flow to the engine via the purge line and open CPV.

At 414, the method 400 may include activating the FOH and opening the second valve. As such, the FOH may heat air and the second valve may route the heated air to the canister. The heated air may assist releasing the vapors from the canister. Fuel from a fuel tank may be provided to the FOH, via a pump, and combustion therein may be initiated.

At 416, the method 400 may include adjusting a cabin heating valve position based on a cabin heating request. The cabin heating valve may be moved to a more open position as the cabin heating request increases.

In one example, a setting, such as a fueling or mass air flow, of the FOH may be adjusted based on one or more of the cabin heating request, an estimate of the engine stop duration, and a canister load. For example, fueling of the FOH may increase in response to one or more of the cabin heating request increasing, the estimate of the engine off duration decreasing, and the canister load being relatively high. The canister load may be relatively high if it is above a threshold canister load. Additionally or alternatively, the canister load may affect a desorption rate, wherein the desorption rate may increase when the canister load is relatively high. The estimate of the engine off duration may be based on a vehicle operator driving behavior, time of day, traffic conditions, vehicle location, and the like. For example, if the vehicle operator is stopped at a traffic light, a duration of the stop may be learned based on previous stops at a similar time of day and under similar traffic conditions.

In one real world example, if the canister load is above the threshold canister load and the estimate of the engine off duration is relatively short, then the FOH may be operated at a relatively high temperature with a relatively high amount of air and fuel. Conversely, if the canister load is less than the threshold canister load and/or is the estimate of the engine off duration is relatively long, then the FOH may be operated at a relatively low temperature with a relatively low amount of air and/or fuel.

At 418, the method 400 may optionally include closing the first valve. In one example, if the vehicle is an ICE-only vehicle and does not include an electric motor, the first valve and the first passage may not be included in the FOH system. However, the first valve and the first passage are included in a hybrid vehicle layout including an electric motor and an ICE. The first valve may be closed to block vapors from the canister from flowing to the FOH. In one example, the first valve may be closed when an engine restart following the purge event of method 400 is scheduled to occur. As such, the vapors may be used for combustion in the engine to promote locomotion of the vehicle.

If the engine restart is not scheduled, then the vapors may be directed to the FOH in a closed loop operation. The CPV may be closed and the first valve may be opened to flow vapors desorbed from the canister to the FOH. The closed loop operation is described in greater detail with respect to FIG. 5.

In some examples, additionally or alternatively, vapors from the canister may be directed to each of the engine and the FOH. The CPV and the first valve may be moved to partially open positions to promote vapor flow to the engine and the FOH, respectively. In one example, the amount of vapor flow to the FOH may be adjusted based on engine combustion conditions during previous engine restart events following the purge event. For example, if engine knock or other condition occurs during the engine restart, then more or less vapors may be directed to the FOH.

At 420, the method 400 may include flowing heated air from the FOH to the canister. In one example, ambient air is heated by the FOH and directed through the second passage to the canister. The heated air may release vapors from the canister.

At 422, the method 400 may include flowing canister vapors into engine cylinders. In one example, intake valves of the engine cylinders are open and exhaust valves of the engine cylinders are closed. In this way, vapors may be stored in the engine cylinders and consumed upon engine restart. Fueling parameters may be adjusted during the engine restart to account for the fuel vapors stored therein. Thus, in one example, the engine fueling upon an engine restart following an engine stop may be adjusted based on one or more of a canister vapor load, desorption rate, FOH fueling, cabin heating request, and second valve position. For example, the engine fueling upon an engine restart may be decreased in response to the FOH fueling increasing. Additionally or alternatively, the engine fueling upon an engine restart may decrease in response to the canister vapor load decreasing to account for the vapors from the canister being in the engine. The FOH may be deactivated upon restarting the engine Turning now to FIG. 5, it shows a method 500 for consuming vapors from the canister via the FOH when breakthrough may occur. The method 500 begins at 502 following a "no" at 406 of FIG. 4. As such, the ambient temperature is above the determined ambient temperature, and at 502, the method 500 includes determining if a canister breakthrough likelihood is greater than a threshold likelihood. The canister breakthrough likelihood may be based on a combination of the ambient temperature, the canister load, and a period of time in which the engine has been off. For example, the canister breakthrough likelihood increases when the ambient temperature increases and/or when the canister load increases and/or when the period of time the engine is off (e.g., engine off duration) increases. The threshold likelihood may be based on a percentage such as 50%, or 70%, or 90% likelihood that vapors may escape from the canister. In one example, a relative canister load may be determined based on a combination of a canister load and the ambient temperature. If the canister breakthrough likelihood is not greater than the threshold likelihood, then at 504, the method 500 may include not flowing the canister vapors to the FOH. As such, the FOH may not be activated.

If the canister breakthrough likelihood is greater than the threshold likelihood, then at 506, the method 500 may include determining if the engine is off. The engine may be off during a start/stop or all-electric operation of the vehicle. Additionally or alternatively, the engine may be off when the vehicle is turned off in response to the vehicle operator depressing an ignition button and/or removing an ignition key. If the engine is not off, then the method 500 proceeds to 504 as described above. The FOH may not be used to consume canister vapors or promote vapor desorption when the engine is on.

If the engine is off, then at 506, then at 508, the method 500 may include activating the FOH. Activating the FOH may include flowing fuel and air to the at least one cylinder of the FOH. Fuel may be provided from the fuel tank via a pump. Combustion may occur within the FOH, which may be used to heat air.

At 510, the method 500 may include opening the first valve. As such, the first passage may flow gases from the purge line into the inlet of the FOH.

At 512, the method 500 may include opening the second valve. Heated air from the FOH may be directed to the canister, which may urge vapors to be released therefrom.

At 514, the method 500 may include closing the CPV. Vapors from the canister are blocked from flowing to an intake of the engine.

At 516, the method 500 may include switching the ELCM to a pressure mode. The pressure mode may be used to control a temperature of warmed air flowing to the canister. Additionally or alternatively, a changeover valve in the ELCM may be used to control the temperature.

At 518, the method 500 may include flowing vapors from the canister to the FOH. The vapors may flow into the combustion chamber of the FOH and combust. As such, the vapors may be consumed such that unburned hydrocarbons are not released to atmosphere. In one example, a fueling of the FOH may be adjusted based on a desorption rate of the canister. For example, as the desorption rate increases, the fueling of the FOH may be reduced to account for more vapors flowing to the FOH compared to a lower desorption rate.

At 520, the method 500 may include flowing heated air from the FOH to the canister. The heated air may be hotter than ambient air and may promote the vapors to release from the adsorbent of the canister. The FOH may remain active until one or more of the engine is turned on, the vehicle is turned off, the canister load decreases below a lower limit, and the ambient temperature decreases below the threshold ambient temperature.

Turning now to FIG. 6, it graphically illustrates an operating sequence via plot 600 illustrating changes to conditions of the FOH system and the evaporative emissions control system when the canister is being cleaned (e.g., vapors removed therefrom). Plot 610 illustrates if the FOH is on or off. Plot 620 illustrates an ambient temperature. Plot 630 illustrates a canister load and dashed line 632 illustrates a threshold canister load. Plot 640 illustrates if the engine is on or off. Prior to t1, the engine and the FOH are off. The ambient temperature increases to a relatively high, which causes a relative canister load to increase. The relative canister load may account for an actual canister load and the ambient temperature. In one example, the actual canister load is determined via a hydrocarbon sensor mounted at a canister port. Additionally or alternatively, the actual canister load may be estimated based on an engine operating period and/or FOH operating period.

At t1, the relative canister load is equal to the threshold canister load. The FOH is activated. Between t1 and t2, the FOH begins to heat air and flow the heated air to the canister. The relative canister load decreases as vapors therefrom are directed to the FOH. The FOH may combust the vapors in combination with fuel delivered from the vehicle fuel tank.

At t2, the relative canister load is relatively low and less than the threshold canister load. As such, the FOH is deactivated and no longer consumes fuel or heats air. After t2, the canister load begins to increase as the engine remains off.

The disclosure provides support for a method including heating air using a fuel-operated heater (FOH) and routing heated air from the FOH to a canister in an evaporative emissions control system. A first example of the method further includes routing vapors from the canister to the FOH. A second example of the method, optionally including the first example, further includes where the FOH combusts the vapors. A third example of the method, optionally including one or more of the previous examples, further includes where using the FOH further comprises deactivating an engine. A fourth example of the method, optionally including one or more of the previous examples, further includes where routing heated air from the FOH to a vehicle cabin interior. A fifth example of the method, optionally including one or more of the previous examples, further includes where routing vapors from the canister to an engine, wherein intake valves of the engine are open and exhaust valves of the engine are closed.

The disclosure provides additional support for a system including an engine, an evaporative emissions control system comprising a canister, a fuel tank, and a fuel-operated heater (FOH) fluidly coupled to the canister. A first example of the system further includes where a controller with computer-readable instructions stored in non-transitory memory thereof that when executed enable the controller to flow heated air from the FOH to the canister during a purge event. A second example of the system, optionally including the first example, further includes where the instructions further cause the controller to close a first valve in a first passage and open a canister purge valve to flow vapors from the canister only to the engine. A third example of the system, optionally including one or more of the previous examples, further includes where the instructions further cause the controller to adjust fueling of the engine upon an engine restart following the purge event based on one or more of a fueling of the FOH and a cabin heating request during the purge event. A fourth example of the system, optionally including one or more of the previous examples, further includes where a controller with computer-readable instructions stored in non-transitory memory thereof that when executed enable the controller to flow heated air from the FOH to the canister in response to an ambient temperature being greater than a threshold temperature. A fifth example of the system, optionally including one or more of the previous examples, further includes where the instructions further cause the controller to adjust a position of a first valve in a first passage to flow vapors from the canister to the FOH, and wherein the instructions further cause the controller to adjust a position of a second valve in a second passage to flow heated air from the FOH to the canister. A sixth example of the system, optionally including one or more of the previous examples, further includes where the instructions further cause the controller to adjust a fueling of the FOH based on one or more of an engine stop duration, a canister load, the ambient temperature, and a desorption rate of the canister. A seventh example of the system, optionally including one or more of the previous examples, further includes where the FOH is fluidly coupled to the canister via a first passage coupled to a purge line of the canister and a second passage coupled to a vent line of the canister. An eighth example of the system, optionally including one or more of the previous examples, further includes where the first passage comprises a first valve configured to control an amount of vapor flowing to the FOH.

The disclosure provides further support for a method including fueling a fuel-operated heater (FOH) and routing heated air from the FOH to a canister arranged in an evaporative emission control system. A first example of the method further includes flowing vapors from the canister to the FOH via a purge line and a first passage, wherein fueling the FOH is adjusted based on a desorption rate of the canister. A second example of the method, optionally including the first example, further includes flowing vapors from the canister to an engine via a purge line, further comprising adjusting a fueling of the engine upon an engine restart based on one or more of the FOH fueling and a desorption rate of the canister. A third example of the method, optionally including one or more of the previous examples, further includes where each of the canister and the FOH is fluidly coupled to a fuel tank. A fourth example of the method, optionally including one or more of the previous examples, further includes where fueling the FOH is adjusted based on a cabin heating request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
heating air using a fuel-operated heater (FOH);
routing heated air from the FOH to a canister in an evaporative emissions control system; and
routing vapors from the canister to the FOH, wherein the FOH combusts the vapors.

2. The method of claim 1, wherein using the FOH further comprises deactivating an engine.

3. The method of claim 1, further comprising routing heated air from the FOH to a vehicle cabin interior.

4. The method of claim 1, further comprising routing vapors from the canister to an engine, wherein intake valves of the engine are open and exhaust valves of the engine are closed.

5. A system, comprising:
an engine;
an evaporative emissions control system comprising a canister;
a fuel tank; and
a fuel-operated heater (FOH) fluidly coupled to the canister, wherein the FOH is fluidly coupled to the canister via a first passage coupled to a purge line of the canister and a second passage coupled to a vent line of the canister, and wherein the first passage comprises a first valve configured to control an amount of vapor flowing to the FOH.

6. The system of claim 5, further comprising a controller with computer-readable instructions stored in non-transitory memory thereof that when executed enable the controller to flow heated air from the FOH to the canister during a purge event.

7. The system of claim 6, wherein the instructions further cause the controller to close the first valve in the first passage and open a canister purge valve to flow vapors from the canister only to the engine.

8. The system of claim 6, wherein the instructions further cause the controller to adjust fueling of the engine upon an engine restart following the purge event based on one or more of a fueling of the FOH and a cabin heating request during the purge event.

9. The system of claim 5, further comprising a controller with computer-readable instructions stored in non-transitory memory thereof that when executed enable the controller to flow heated air from the FOH to the canister in response to an ambient temperature being greater than a threshold temperature.

10. The system of claim 9, wherein the instructions further cause the controller to adjust a position of the first valve in the first passage to flow vapors from the canister to the FOH, and wherein the instructions further cause the controller to adjust a position of a second valve in a second passage to flow heated air from the FOH to the canister.

11. The system of claim 9, wherein the instructions further cause the controller to adjust a fueling of the FOH based on one or more of an engine stop duration, a canister load, the ambient temperature, and a desorption rate of the canister.

12. A method, comprising:
fueling a fuel-operated heater (FOH);
routing heated air from the FOH to a canister arranged in an evaporative emission control system; and
flowing vapors from the canister to the FOH via a purge line and a first passage, wherein fueling the FOH is adjusted based on a desorption rate of the canister.

13. The method of claim 12, further comprising flowing vapors from the canister to an engine via a purge line, further comprising adjusting a fueling of the engine upon an engine restart based on one or more of the FOH fueling and a desorption rate of the canister.

14. The method of claim 12, wherein each of the canister and the FOH is fluidly coupled to a fuel tank.

15. The method of claim 12, wherein fueling the FOH is adjusted based on a cabin heating request.

* * * * *